(12) United States Patent (10) Patent No.: US 12,578,815 B2
Qu et al. (45) Date of Patent: Mar. 17, 2026

(54) TOUCH-CONTROL DISPLAY PANEL AND DISPLAY APPARATUS

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Yi Qu, Beijing (CN); Zhiwen Chu, Beijing (CN); Xinxin Wang, Beijing (CN); Yang Zhou, Beijing (CN); Lu Bai, Beijing (CN); Junxiu Dai, Beijing (CN); Aoyuan Feng, Beijing (CN)

(73) Assignees: CHENGDU BOE OPTOELECTRONICS TECHNOLOGY CO., LTD., Chengdu (CN); BOE TECHNOLOGY GROUP CO., LTD, Beijing (CN)

( * ) Notice: Subject to any disclaimer, the term of this patent is extended or adjusted under 35 U.S.C. 154(b) by 0 days.

(21) Appl. No.: 18/992,215

(22) PCT Filed: Aug. 30, 2022

(86) PCT No.: PCT/CN2022/115927
§ 371 (c)(1),
(2) Date: Jan. 8, 2025

(87) PCT Pub. No.: WO2024/044983
PCT Pub. Date: Mar. 7, 2024

(65) Prior Publication Data
US 2025/0258563 A1 Aug. 14, 2025

(51) Int. Cl.
G06F 3/041 (2006.01)
G09G 3/3233 (2016.01)

(52) U.S. Cl.
CPC ........ G06F 3/04164 (2019.05); G06F 3/0412 (2013.01); G09G 3/3233 (2013.01);
(Continued)

(58) Field of Classification Search
CPC .... G06F 3/04164; G06F 3/0412; G06F 3/044; G06F 3/041; G09G 3/3233;
(Continued)

(56) References Cited

U.S. PATENT DOCUMENTS

| 8,930,594 | B1 | 1/2015 | Rodman et al. | |
| 2012/0161805 | A1* | 6/2012 | Jung ..................... | G09G 3/006 |
| | | | | 324/754.07 |

(Continued)

FOREIGN PATENT DOCUMENTS

| CN | 107402680 A | 11/2017 |
| CN | 110718191 A | 1/2020 |

(Continued)

OTHER PUBLICATIONS

International Search Report of application No. PCT/CN2022/115927 dated May 6, 2023.
(Continued)

*Primary Examiner* — Temesghen Ghebretinsae
*Assistant Examiner* — Sosina Abebe
(74) *Attorney, Agent, or Firm* — Calfee, Halter & Griswold LLP

(57) ABSTRACT

A touch-control display panel is provided with a display region, a peripheral region and a lead-out region, wherein the peripheral region is located outside the display region; and the lead-out region is arranged outside the peripheral region in a column direction, and the lead-out region has a bonding portion for connecting to a flexible circuit board. The touch-control display panel includes a touch-control layer and a drive chip. The drive chip is provided with a touch-control pin group and gating circuits, wherein the touch-control pin group includes first touch-control pins, which include functional pins and dummy pins; and the touch-control layer is connected to the functional pins by means of touch-control leads, one functional pin being connected to one touch-control lead.

18 Claims, 8 Drawing Sheets

(52) U.S. Cl.
CPC ............... *G09G 2300/0426* (2013.01); *G09G 2300/0819* (2013.01); *G09G 2300/0842* (2013.01); *G09G 2300/0861* (2013.01)

(58) Field of Classification Search
CPC ... G09G 2300/0426; G09G 2300/0819; G09G 2300/0842; G09G 2300/0861
See application file for complete search history.

(56) References Cited

U.S. PATENT DOCUMENTS

| | | | | |
|---|---|---|---|---|
| 2020/0125204 | A1* | 4/2020 | Yang .................... | G09G 3/2074 |
| 2020/0310594 | A1* | 10/2020 | Yang .................... | G06F 3/0443 |
| 2021/0011325 | A1* | 1/2021 | Yeh ..................... | G02F 1/13454 |
| 2021/0020082 | A1* | 1/2021 | Wang .................... | H01L 22/32 |
| 2021/0367001 | A1* | 11/2021 | Chen .................... | H10K 59/40 |
| 2022/0066609 | A1* | 3/2022 | Han .................... | G06F 3/04164 |
| 2022/0189377 | A1* | 6/2022 | Wang .................... | G09G 3/3266 |
| 2022/0256706 | A1* | 8/2022 | Xiong .................. | G06F 3/04164 |
| 2023/0359300 | A1* | 11/2023 | Liu ..................... | G06F 3/0412 |
| 2024/0028157 | A1* | 1/2024 | Ma ..................... | G06F 3/0412 |
| 2024/0045545 | A1* | 2/2024 | Xu ..................... | G06F 3/041 |
| 2024/0428711 | A1* | 12/2024 | Hao ..................... | G09G 3/32 |

FOREIGN PATENT DOCUMENTS

| | | |
|---|---|---|
| CN | 111710275 A | 9/2020 |
| CN | 215895423 U | 2/2022 |

OTHER PUBLICATIONS

Written Opinion of application No. PCT/CN2022/115927 dated May 6, 2023.

* cited by examiner

<u>TSP</u>

TOUCH-CONTROL DISPLAY PANEL AND DISPLAY APPARATUS

CROSS REFERENCE

The present application is a U.S. National Stage of International Application No. PCT/CN2022/115927, filed on Aug. 30, 2022, the contents of which are incorporated herein by reference in its entirety for all purposes.

TECHNICAL FIELD

The present disclosure relates to the field of touch technologies, and in particular to a touch display panel and a display device.

BACKGROUND

Touch display panels are an important component of mobile phones, smart watches and other terminal devices. While realizing image display, the touch display panels can also realize human-computer interaction through touch operations.

It should be noted that the information disclosed in the Background section above is only for enhancing the understanding of the background of the present disclosure, and thus may include information that does not constitute prior art known to those of ordinary skill in the art.

SUMMARY

The present disclosure provides a touch display panel and a display device.

According to an aspect of the present disclosure, there is provided a touch display panel, including a display area, a peripheral area and a lead-out area, wherein the peripheral area is located outside the display area, the lead-out area is arranged outside the peripheral area along a column direction, and the lead-out area includes a binding portion for coupling to a flexible circuit board;

the touch display panel includes:

a touch layer;

a driving chip, including at least one touch pin group and a plurality of gating circuits, wherein the touch pin group includes a plurality of first touch pins, and first touch pins of a touch pin group include a plurality of functional pins and at least one dummy pin; the touch layer is coupled to individual functional pins through a plurality of touch leads, and a functional pin is at least coupled to a touch lead; the driving chip further includes a second touch pin coupled to the binding portion;

the second touch pin is coupled to individual first touch pins through a gating circuit; first touch pins coupled to at least one of the gating circuits are all dummy pins;

a gating circuit coupled to functional pins is configured to sequentially conduct a second touch pin and respective functional pins coupled to the second touch pin, and a gating circuit coupled to a dummy pin is turned off.

According to an aspect of the present disclosure, a display device includes the touch display panel described in any one of the above embodiments.

It should be noted that the above general description and the following detailed description are merely exemplary and explanatory and should not be construed as limiting of the disclosure.

BRIEF DESCRIPTION OF THE DRAWINGS

The drawings herein are incorporated in and constitute a part of the specification, illustrate embodiments consistent with the present disclosure, and together with the description serve to explain principles of the present disclosure. Apparently, the drawings in the following description are only some embodiments of the present disclosure. For those of ordinary skill in the art, other drawings may be obtained based on these drawings without paying any creative effort.

DETAILED DESCRIPTION

Figure 1:
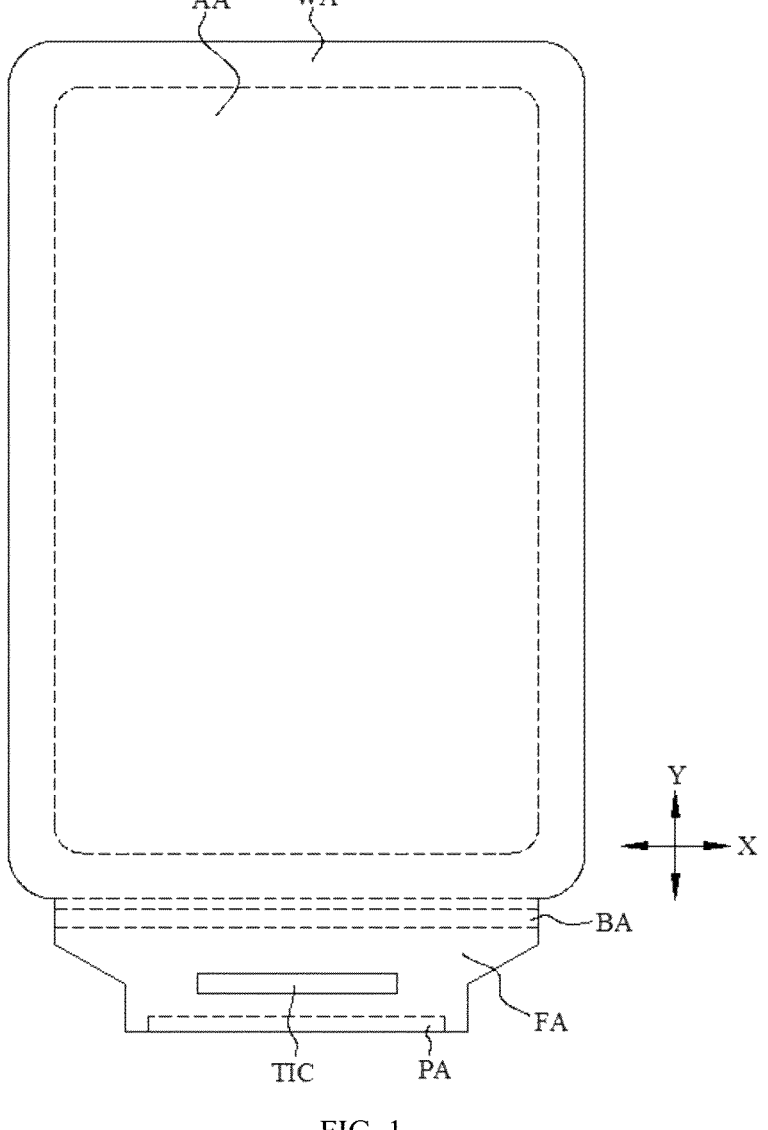
FIG. 1 is a top view of an embodiment of a touch display panel in the present disclosure.

Example embodiments will now be described more fully with reference to the accompanying drawings. However, the example embodiments can be implemented in a variety of forms and should not be construed as being limited to examples set forth herein; rather, these embodiments are provided so that the present disclosure will be more complete and comprehensive so as to convey the idea of the example embodiments to those skilled in this art. The same reference numerals in the drawings denote the same or similar structures, and the detailed description thereof will be omitted. In addition, the drawings are merely schematic representations of the present disclosure and are not necessarily drawn to scale.

The terms "one", "a", "the", "said", and "at least one" are used to indicate that there are one or more elements/components or the like; the terms "include" and "have" are used to indicate an open meaning of including and means that there may be additional elements/components/etc. in addition to the listed elements/components/etc.; the terms "first", "second" and "third" etc. are used only as markers, and do not limit the number of objects.

A row direction and a column direction Y herein are just two directions perpendicular to each other. In the drawings of the present disclosure, the row direction can be horizontal and the column direction Y can be vertical, but it is not limited to this. If a touch display panel rotates, actual orientations of the row direction and the column direction Y may change.

"Overlapping" of Feature A and feature B herein means that an orthographic projection of feature A on the substrate and an orthographic projection of feature B on the substrate at least partially overlap.

Embodiments of the present disclosure provide a touch display panel. As shown in FIG. 1, the touch display panel has a display area AA, a peripheral area WA and a lead-out area FA. The peripheral area WA is located outside the display area AA, and the peripheral area WA may be a continuous or discontinuous annular area surrounding the display area AA, or may also be a semi-enclosed area, and a shape of the peripheral area WA is not specifically limited here. The lead-out area FA is located outside the peripheral area WA and extends away from the display area AA along a column direction Y. The lead-out area FA has a binding portion PA, and the binding portion PA may have a plurality of pins, and at least part of the pins of the binding portion PA may be coupled to a flexible circuit board, and the flexible circuit board may be bound to a control circuit board. Thus, the coupling between the touch display panel and the control circuit board is realized, and the touch display panel can be controlled by the control circuit board to display an image and realize a touch function.

In some embodiments of the present disclosure, the lead-out area FA may include a bending area BA extended along a row direction X, the bending area BA is a bendable flexible structure, and the binding portion PA is located on a side of the bending area BA away from the display area AA. By bending the bending area BA, the lead-out area FA can be bent to a backlight side (that is, a side opposite to a light emitting direction) of the touch display panel. Thus, the flexible circuit board can be coupled to the control circuit board on the backlight side of the touch display panel.

Alternatively, in other embodiments of the present disclosure, the lead-out area FA may not be provided with the bending area BA, and by bending the flexible circuit board, the flexible circuit board can be coupled to the control circuit board on the backlight side of the touch display panel.

As shown in FIG. 2, FIG. 5, FIG. 6 and FIG. 7, the touch display panel may include a touch layer TSP and a driving chip TIC.

The touch layer TSP is configured to sense a touch operation, so that the touch display panel displays a specified image, thereby realizing human-computer interaction.

The driving chip TIC has at least one touch pin group PG and a plurality of gating circuits Mux. The touch pin group PG includes a plurality of first touch pins P1, and the first touch pins P1 of a touch pin group PG include a plurality of functional pins P1a and at least one dummy pin P1d. The touch layer TSP is coupled to the functional pins P1a through a plurality of touch leads TL1, and thus coupled to the driving chip TIC. A functional pin P1a is at least coupled to a touch lead TL1, and the driving chip TIC may also have a second touch pin P2, and the second touch pin P2 may be coupled to the binding portion PA.

The second touch pin P2 is coupled to respective first touch pins P1 through a gating circuit Mux, and first touch pins P1 coupled to at least one gating circuit Mux are all dummy pins P1d; and the gating circuit Mux coupled to the functional pins P1a is configured to sequentially conduct the second touch pin P2 and respective functional pins P1a coupled thereto, and the gating circuit Mux coupled to the dummy pin P1d is turned off.

In the touch display panel of embodiments of the present disclosure, a touch driving signal for driving the touch layer TSP to sense the touch operation can be transmitted, through the functional pin P1a among the first touch pins P1, to the touch layer TSP in the display area AA. The first touch pin P1 and the second touch pin P2 are selectively conducted through the gating circuit Mux to transmit the touch driving signal. Therefore, by controlling individual gating circuits Mux, the touch driving signals can be transmitted to individual touch leads TL1 through functional pins P1a among individual first touch pins P1, thereby realizing scanning of the touch layer TSP to sense the touch operation.

In the above process, the gating circuit Mux coupled to the functional pin P1a is in an on state, and the second touch pin P2 and the functional pins P1a coupled thereto can be conducted in a time-sharing manner to obtain different transmission paths, while the gating circuit Mux coupled to the dummy pin P1d can be set to an off state to reduce energy consumption.

The touch display panel in the present disclosure is described in detail below.

Figure 2:
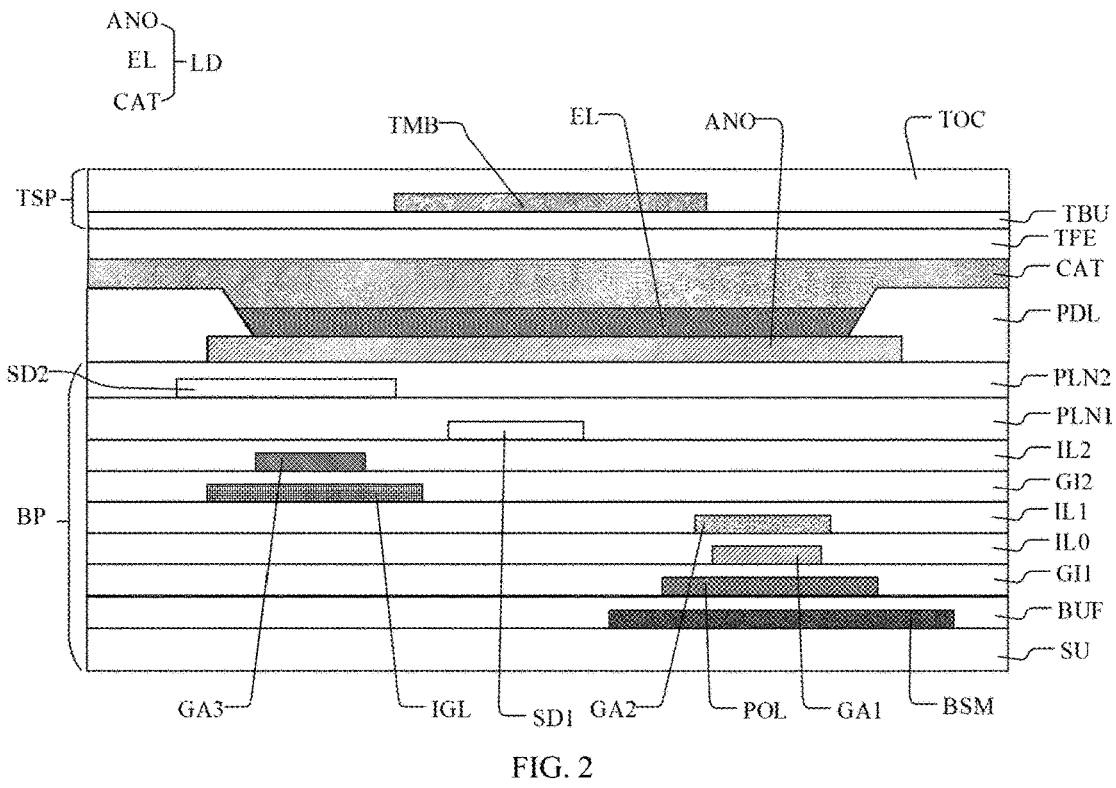
FIG. 2 is a partial cross-sectional schematic diagram of an embodiment of a touch display panel in the present disclosure.

As shown in FIG. 2, the touch display panel may at least include a driving backplane BP, a light emitting device LD and the touch layer TSP. The driving backplane BP is configured to drive the light emitting device LD to emit light. The light emitting device LD may include a first electrode ANO, a light emitting layer EL and a second electrode CAT stacked in a direction away from the driving backplane BP.

The driving backplane BP may include a driving circuit for driving each light emitting device LD to emit light independently. The driving circuit may include a pixel circuit and a peripheral circuit, the number of pixel circuits is multiple, and at least part of the pixel circuits may be arranged in the display area AA. Alternatively, a partial area of some pixel circuits may be located in the peripheral area WA. The pixel circuit may include multiple transistors and a capacitor, which may be a 3T1C pixel circuit, a 7T1C pixel circuit and another pixel circuit. nTmC means that a pixel circuit includes n transistors (indicated by the letter "T") and m capacitors (indicated by the letter "C"). The pixel circuits are distributed in an array of multiple rows and multiple columns. A pixel circuit may be coupled to one light emitting device LD. Alternatively, there may also be a situation where one pixel circuit is coupled to multiple light emitting devices LD. The one-to-one coupling between the pixel circuit and the light emitting device LD is taken as an example for illustration herein.

Figure 4:
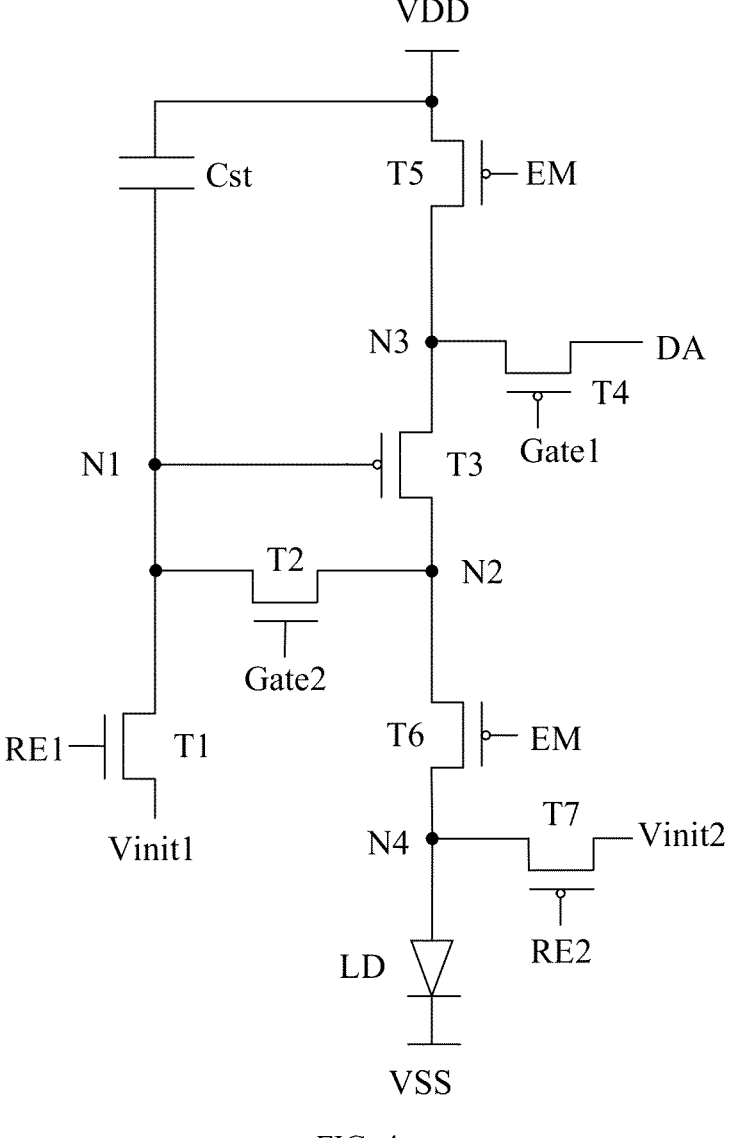
FIG. 4 is a schematic diagram of a pixel circuit in an embodiment of a touch display panel in the present disclosure.

In some embodiments of the present disclosure, as shown in FIG. 4, the pixel circuit may be a 7T1C structure, which may have 7 transistors and 1 capacitor, that is, a first reset transistor T1, a compensation transistor T2, a driving transistor T3, a writing transistor T4, a first light emitting control transistor T5, a second light emitting control transistor T6, a second reset transistor T7 and a storage capacitor Cst.

In addition, in order to facilitate the transmission of signal to the pixel circuit, the driving backplane BP may further include a gate line, a reset signal line, a data line, a power line, etc., the number of gate lines and the number of reset signal lines are both multiple, and the gate lines and the reset signal lines pass through the display area AA along the row direction X and extend into the peripheral area WA, and a pixel circuit is coupled to multiple gate lines and multiple reset signal lines. The gate lines coupled to the same pixel circuit may include a first reset control line, a second reset control line, a scan line, and a light emitting control line, and the reset signal lines coupled to the same pixel circuit may include a first reset signal line and a second reset signal line.

The data line and the power line both extends through the display area AA along the column direction Y and into the peripheral area WA. A column of pixel circuits is at least coupled to a data line and a power line.

A first electrode of the first reset transistor T1 is coupled to the first reset signal line to receive a first reset signal Vinit1, and a second electrode of the first reset transistor T1 is coupled to a gate of the driving transistor T3 and a first plate of the capacitor Cst.

A first electrode of the compensation transistor T2 is coupled to a second electrode of the driving transistor T3, and a second electrode of the compensation transistor T2 is coupled to a gate of the driving transistor T3.

A first electrode of the writing transistor T4 is coupled to a data line to receive a data signal DA, and a second electrode of the writing transistor T4 is coupled to a first electrode of the driving transistor T3.

A first electrode of the first light emitting control transistor T5 and a second plate of the capacitor Cst are coupled to a power line to receive a first power signal VDD, and a second electrode of the first light emitting control transistor T5 is coupled to the first electrode of the driving transistor T3.

A first electrode of the second light emitting control transistor T6 is coupled to the second electrode of the driving transistor T3, and a second electrode of the second light emitting control transistor T6 is coupled to a first electrode ANO of a light emitting device LD.

A first electrode of the second reset transistor T7 is coupled to a second reset signal line to receive the second reset signal Vinit2, and a second electrode of the second reset transistor T7 is coupled to a second electrode of the second light emitting control transistor T6. A second electrode CAT of the light emitting device LD can receive a second power signal VSS.

In addition, in order to control the on and off of each transistor, the gate of the first reset transistor T1 is coupled to the first reset control line to input a first reset control signal RE1, and the gate of the second reset transistor T7 is coupled to the second reset control line to input a second reset control signal RE2. The gates of the compensation transistor T2 and the writing transistor T4 are coupled to the scan line to input the scan signal, and the gates of the first light emitting control transistor T5 and the second light emitting control transistor T6 are coupled to a light emitting control line to input a light emitting control signal EM.

Each transistor of the above-mentioned pixel circuit can adopt a polycrystalline silicon transistor, that is, a channel of the transistor is polycrystalline silicon, such as a P-type low-temperature polycrystalline silicon transistor or an N-type low-temperature polycrystalline silicon transistor. Alternatively, a metal oxide transistor can also be adopted, that is, the channel of the transistor is a metal oxide such as indium gallium zinc oxide. The P-type low-temperature polycrystalline silicon transistor can be turned off when a high level is input to its gate, and can be turned on when a low level signal is input. The N-type low-temperature polycrystalline silicon transistor can be turned off when a low level is input to its gate, and can be turned on when a high level signal is input. The metal oxide transistor can be an N-type metal oxide transistor, which can be turned on when a high level is input to the gate, and can be turned off when a low level is input.

In some embodiments of the present disclosure, the above-mentioned 7T1C pixel circuit may adopt LTPO (LTPS+Oxide) technologies. Specifically, the driving transistor T3, the writing transistor T4, the second reset transistor T7, the first light emitting control transistor T5 and the second light emitting control transistor T6 may adopt P-type low temperature polysilicon transistors; the first reset transistor T1 and the compensation transistor T2 may adopt N-type metal oxide transistors. Since the P-type low temperature polysilicon transistor has a higher carrier mobility, it is conducive to realizing a display panel with high resolution, high response speed, high pixel density and high aperture ratio, so as to obtain a higher carrier mobility and improve the response speed. In addition, the leakage can be reduced by the N-type metal oxide transistor.

An operating principle of the above pixel circuit is explained below.

In a reset stage t1: the first reset transistor T1 is turned on by the first reset control signal RE1, and the first reset signal Vinit1 is written to the first node N1. At the same time, the second reset transistor T7 is turned on by the second reset control signal RE2, and the second reset signal Vinit2 is written to the fourth node N4. Thus, the gate of the driving transistor T3 and the light emitting device LD can be reset.

In a writing stage t2: the writing transistor T4 and the compensation transistor T2 are turned on by the first scan signal Gate1 and the second scan signal Gate2, and the data signal DA is written to the first node N1 through the third node N3 and the second node N2 until the potential reaches Vdata+vth, where Vdata is a voltage of the data signal DA, and Vth is a threshold voltage of the driving transistor T3. The first scan signal Gate1 and the second scan signal Gate2 can be the same signal or two synchronous signals. In addition, the first scan signal Gate1 and the second scan signal Gate2 can be high-frequency signals, which is conducive to reducing the load of the source signal of the driving transistor T3.

In a light emitting stage t3: the first light emitting control transistor T5 and the second light emitting control transistor T6 are turned on by the light emitting control signal EM, the driving transistor T3 is turned on under the action of the voltage Vdata+Vth stored in the capacitor Cst and the second power signal VDD, and the light emitting device LD emits light under the action of the second power signal VDD and the first power signal VSS. In this process, the first electrode of the driving transistor T3 serves as the source and the second electrode serves as the drain.

On the one hand, the peripheral circuit can be coupled to the light emitting device LD through the pixel circuit, and the first power signal VDD is applied to the first electrode ANO of the light emitting device LD through the pixel circuit. On the other hand, the peripheral circuit can also be coupled to the second electrode CAT of the light emitting device LD, and the second power signal VSS is applied to the second electrode CAT. By controlling the pixel circuit, the current passing through the light emitting device LD can be controlled, thereby controlling the brightness of the light emitting device LD. The peripheral circuit may include a gate driving circuit and a light emitting control circuit, etc. Alternatively, the peripheral circuit may further include other circuits, and the specific structure of the peripheral circuit is not particularly limited here.

Figure 5:
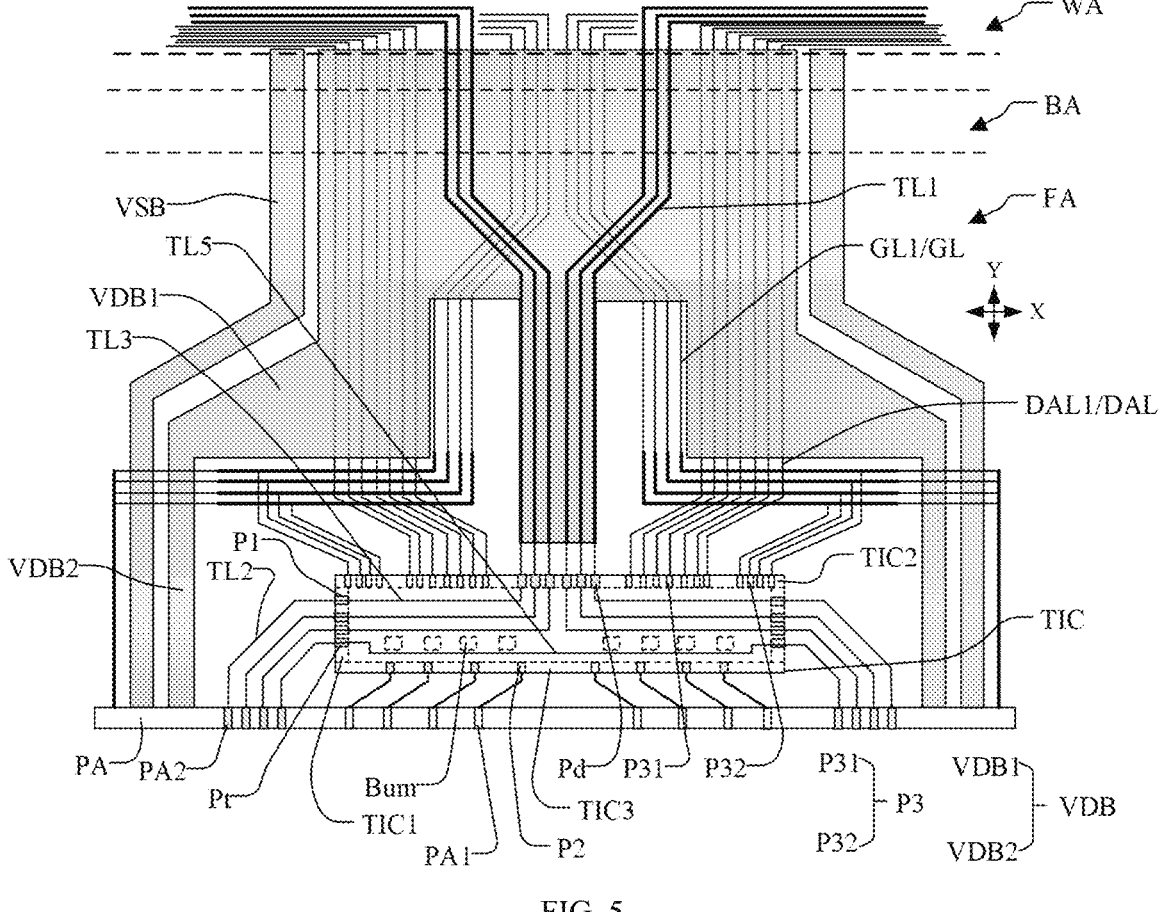
FIG. 5 is a partial top view of a lead-out area in an embodiment of a touch display panel in the present disclosure.

As shown in FIG. 5, the driving backplane BP may further include a bus located in the peripheral area WA, and the bus may extend from the peripheral area WA through the bending area BA into the lead-out area FA, and may be coupled to the binding portion PA. The bus may include a reset signal bus, a first power bus VDB, and a second power bus VSB distributed at intervals in a direction away from the display area AA. The first reset signal line and the second reset signal line are both coupled to the reset signal bus to receive the first reset signal and the second reset signal. The power line may be coupled to the first power bus VDB to receive the first power signal VDD, and the second electrode CAT of each light emitting device LD may be coupled to the second power bus VSB to receive the second power bus signal VSS.

In some embodiments of the present disclosure, the gate driving circuit may include multiple cascaded gate shift register units, which can provide reset control signals and scan signals for multiple rows of pixel circuits, thereby controlling the turn-on timing of transistors. The above-mentioned scan line, first reset control line and second reset control line are all coupled to the gate driving circuit.

For example, a gate shift register unit may include multiple transistors and capacitors, which may be 8T2C, 10T2C or 12T2C, etc. nTmC means that a gate shift register unit includes n transistors (indicated by the letter "T") and m capacitors (indicated by the letter "C"), and its specific structure is not particularly limited here.

A plurality of gate shift register units are cascaded, a first electrode of an input transistor in a first-stage gate shift register unit is coupled to an input end, the input end is used to receive a trigger signal as an input signal, and input ends in other stages of the gate shift register units are electrically coupled to output ends of previous stages of the gate shift register units to receive output signals output by the previous stages of the gate shift register units as input signals, thereby realizing shift output, which is used to scan the pixel circuits of the display area AA row by row.

Figure 3:
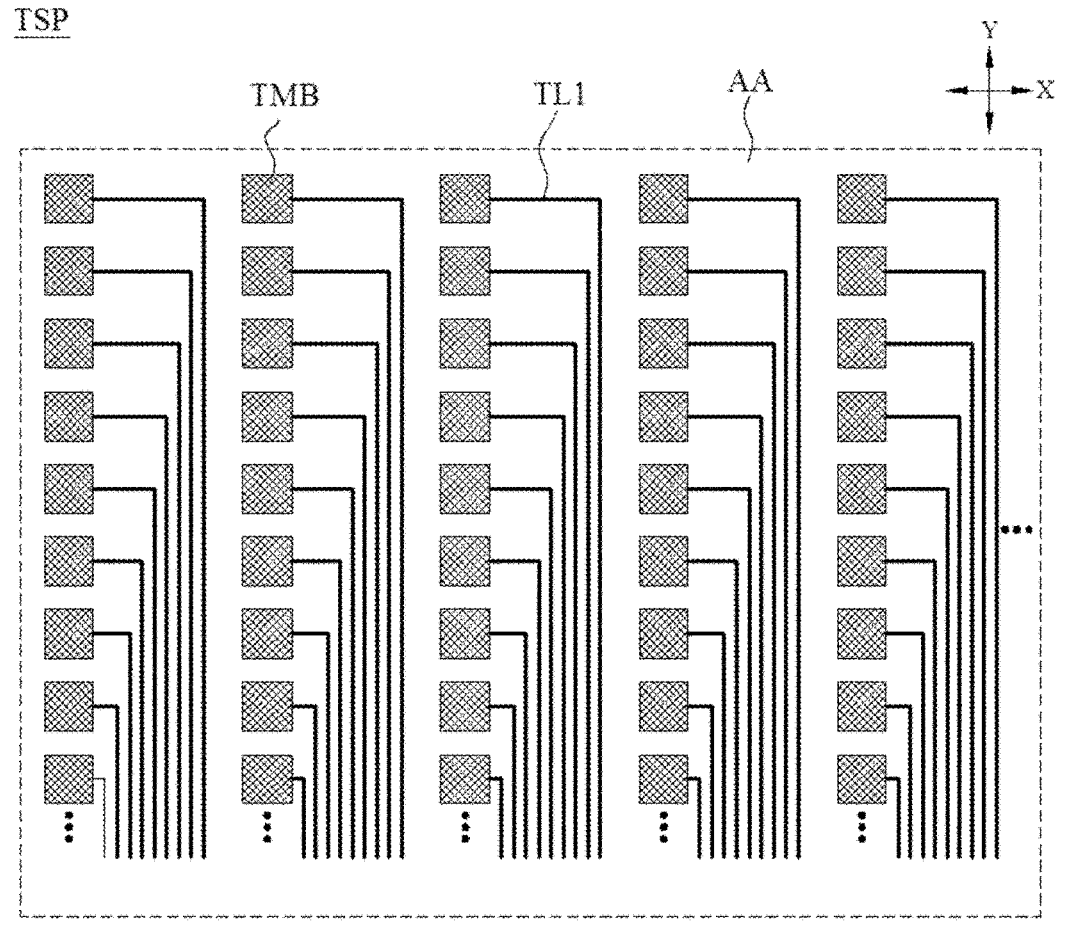
FIG. 3 is a partial top view of a touch layer in an embodiment of a touch display panel in the present disclosure.
Figures 10, 11:
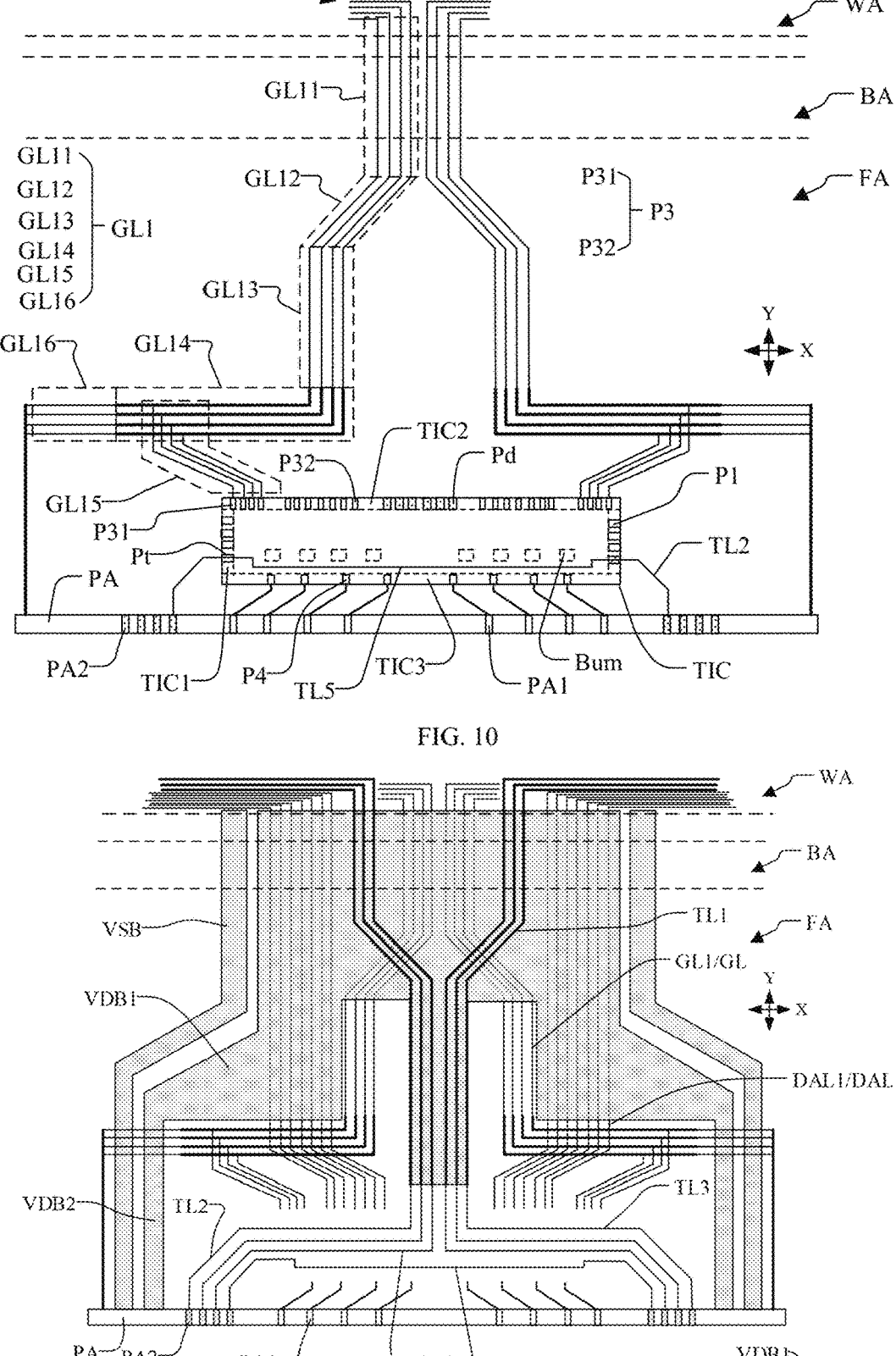
FIG. 10 is a schematic diagram of a peripheral lead in a lead-out area in FIG. 6.
FIG. 11 is a partial top view of a lead-out area without a driving chip in an embodiment of a touch display panel in the present disclosure.

In addition, as shown in FIGS. 3 and 10, in order to facilitate the control of the gate shift register unit, the driving backplane BP may further include peripheral leads GL located in the peripheral area WA, at least part of the peripheral leads GL may extend through the bending area BA into the lead-out area FA, and may be coupled to the peripheral circuit and the driving chip TIC.

The peripheral leads GL may include a driving power line, a trigger signal line, a clock signal line, etc. coupled to the gate shift register unit. For example, the driving power line includes a first driving power line and a second driving power line for providing power to the gate shift register unit, and the trigger signal line is used to provide the above-mentioned trigger signal. The clock signal line may include a first clock signal line and a second clock signal line, which are used to control the conduction timing of at least part of the transistors. The structure and specific operating principle of the gate driving circuit are not specifically limited here.

The light emitting control circuit may include a plurality of light emitting shift register units cascaded along the column direction Y. The structure and operating principle of the light emitting shift register unit are similar to those of the gate shift register unit, and the light emitting shift register unit can control the light emitting control transistors of each row of pixel circuits to turn on and off in sequence. For example, the light emitting shift register unit may be coupled to the light emitting control line and output the light emitting control signal EM to the light emitting control line. In some embodiments of the present disclosure, the light emitting shift register unit may be coupled to the light emitting control line coupled to two rows of pixel circuits. Accordingly, the light emitting shift register unit may also be coupled to a plurality of peripheral leads GL, and these peripheral leads GL may include a driving power line, a trigger signal line, a clock signal line, etc., and their connection relationship will not be described in detail here.

Alternatively, in some embodiments of the present disclosure, the pixel circuit may not include the light emitting control transistor, and correspondingly, the peripheral circuit may not include the light emitting control circuit.

At least part of the peripheral leads GL may be coupled to the driving chip TIC to receive the signal for controlling the peripheral circuit.

As shown in FIG. 2, based on the above 7T1C pixel circuit, in an embodiment of the present disclosure, the driving backplane BP may include a substrate SU, a first semiconductor layer POL, a first gate insulation layer GI1, a first gate layer GA1, a first insulation layer IL0, a second gate layer GA2, a second insulation layer IL1, a second semiconductor layer IGL, a second gate insulation layer GI2, a third gate layer GA3, a third insulation layer IL2, a first source-drain layer SD1, a first planarization layer PLN1, a second source-drain layer SD2, and a second planarization layer PLN2.

The substrate SU may be a base substrate of the driving backplane BP, which may carry the pixel circuit and the peripheral circuit. The substrate SU may be a hard or flexible structure, and may be a single-layer or multi-layer structure, which is not particularly limited herein.

The first semiconductor layer POL may be disposed on a side of the substrate SU and include channels of the driving transistor T3, the writing transistor T4, the second reset transistor T7, the first light emitting control transistor T5 and the second light emitting control transistor T6 in the pixel circuit. A material of the first semiconductor layer POL may be polycrystalline silicon.

The first gate insulation layer GI1 may cover the first semiconductor layer POL, and a material of the first gate insulation layer GI1 may be an insulation material such as silicon nitride and silicon oxide.

The first gate layer GA1 may be disposed on a surface of the first gate insulation layer GI1 away from the substrate SU, and include a first plate of the capacitor.

The first insulation layer IL0 may cover the first gate layer GA1, and a material of the first insulation layer IL0 may be an insulation material such as silicon nitride and silicon oxide.

The second gate layer GA2 may be disposed on a surface of the first insulation layer IL0 away from the substrate SU, and includes a second plate of the capacitor.

The second insulation layer IL1 covers the second gate layer GA2 and may be a single-layer or multi-layer structure, and a material of the second insulation layer IL1 may include an inorganic insulation material such as silicon nitride and silicon oxide, or may include an organic insulation material such as insulation resin.

The second semiconductor layer IGL may be disposed on a surface of the second insulation layer IL1 away from the substrate SU and include channels of the first reset transistor T1 and the compensation transistor T2. A material of the second semiconductor layer IGL may include a semiconductor metal oxide such as indium gallium zinc oxide (IGZO).

The second gate insulation layer GI2 may cover the second semiconductor layer IGL, and a material of the second gate insulation layer GI2 may be an insulation material such as silicon nitride and silicon oxide.

The third gate layer GA3 may be disposed on a surface of the second gate insulation layer GI2 away from the substrate SU.

The third insulation layer IL2 may cover the third gate layer GA3, which may be a single layer or a multi-layer structure, and a material of the third insulation layer IL2 may include an inorganic insulation material such as silicon nitride and silicon oxide, or may include an organic insulation material such as insulation resin. For example, the third insulation layer IL2 may include a dielectric layer and a plurality of inorganic insulation layers sequentially stacked in a direction away from the substrate SU.

The first source-drain layer SD1 may be disposed on a surface of the third insulation layer IL2 away from the substrate SU.

The first planarization layer PLN1 may be disposed on a side of the first source-drain layer SD1 away from the substrate SU, and a material of the first planarization layer PLN1 can be an insulation material such as resin. For example, a passivation layer of insulation material such as silicon nitride can be used to cover the first source-drain layer SD1, and then the passivation layer can be covered with the first planarization layer PLN1.

The second source-drain layer SD2 may be disposed on a surface of the first planarization layer PLN1 away from the substrate SU.

The second planarization layer PLN2 may cover the second source-drain layer SD2, and a material of the second source-drain layer SD2 may be an insulation material such as resin. The light emitting device LD may be disposed on a side of the second planarization layer PLN2 away from the substrate SU.

In addition, as shown in FIG. 2, a light shielding layer BSM may be provided between the substrate SU and the first semiconductor layer POL, which may be made of a light shielding metal or other materials, and may be a single-layer or multi-layer structure. At least a partial area of the light shielding layer BSM may overlap with channel regions of at least part of the transistors to shield the light irradiated to the transistors, so that the electrical characteristics of the transistors are stable. For example, the light shielding layer BSM may include a plurality of light shielding units distributed in an array, and a light shielding unit may shield a channel of a driving transistor T3. In addition, individual light shielding units may be connected by a light shielding line, so that the light shielding layer BSM is an integrated structure, and the second power signal V SS or the second power signal VDD is input to the light shielding layer BSM, so that the light shielding layer BSM plays a role of electrostatic shielding.

Further, as shown in FIG. 2, the light shielding layer BSM may be covered by an insulation buffer layer BUF, and the first semiconductor layer POL may be disposed on a surface of the buffer layer BUF away from the substrate SU. The buffer layer BUF may be a single layer or multi-layer structure, and its material may include an insulation material such as silicon nitride and silicon oxide.

The light emitting device LD is described in detail below.

As shown in FIG. 2, there may be multiple light emitting devices LD, and each light emitting device LD may be coupled to a pixel circuit, and the same pixel circuit may be coupled to one or more light emitting devices LD. The light emitting device LD may be an organic light emitting diode (OLED), a quantum dot light emitting diode (QLED), a Micro LED or a Mini LED, etc., and may include a first electrode ANO, a second electrode CAT and a light emitting layer EL located between the first electrode ANO and the second electrode CAT.

The first electrode ANO may be disposed on a side of the driving backplane BP, for example, a surface of the second planarization layer PLN2 away from the substrate SU. The light emitting layer EL may include a hole injection layer, a hole transport layer, a light emitting material layer, an electron transport layer and an electron injection layer stacked in a direction away from the driving backplane BP. Individual light emitting devices LD may share the second electrode CAT, that is, the second electrode CAT may be a continuous whole layer structure, and the second electrode CAT may extend to the peripheral area WA, and may be coupled to the second power bus VSB to receive the second power signal VSS, and the first electrodes ANO are distributed in an array to ensure that each light emitting device LD can emit light independently. In addition, in order to limit a light emitting range of the light emitting device LD and prevent crosstalk, a pixel definition layer PDL may be disposed on a surface where the first electrode ANO is disposed, and the pixel definition layer PDL may be provided with an opening to expose each first electrode ANO, and the light emitting layer EL is stacked with the first electrode ANO in the opening.

Individual light emitting devices LD may at least share the light emitting material layer, so that light emitting colors of individual light emitting device LD are the same. In this case, in order to achieve color display, a color filter layer may be provided on a side of the light emitting device LD away from the substrate SU, and color display is achieved through filter portions in the color filter layer corresponding to individual light emitting device LD. Alternatively, the light emitting material layers of individual light emitting devices LD may also be independent, so that the light emitting devices LD can directly emit monochromatic light, and the light emitting colors of different light emitting devices LD may be different, thereby achieving color display.

In addition, as shown in FIG. 2, the display panel may further include an encapsulation layer TFE, which may cover the light emitting device LD, and is used to protect the light emitting device LD and prevent external water and oxygen from corroding the light emitting device LD. For example, an encapsulation layer TFE may be encapsulated by thin film encapsulation, and may include a first inorganic layer, an organic layer, and a second inorganic layer. The first inorganic layer covers the light emitting device LD, the organic layer may be disposed on a surface of the first inorganic layer away from the driving backplane BP, and a boundary of the organic layer is limited to an inner side of the boundary of the first inorganic layer, and a boundary of an orthographic projection of the organic layer on the driving backplane BP may be located in the peripheral area WA, ensuring that the organic layer can cover each light emitting device LD. The second inorganic layer may cover the organic layer and the first inorganic layer not covered by the organic layer, and the intrusion of water and oxygen may be blocked by the second inorganic layer, and the planarization may be achieved by the flexible organic layer.

As shown in FIG. 2, the touch layer TSP can be disposed on a side of the light emitting device LD away from the driving backplane BP. For example, the touch layer TSP may be disposed on a surface of the encapsulation layer TFE away from the driving backplane BP. It can adopt a capacitive touch structure, including a self-capacitive structure and a mutual-capacitive structure. The self-capacitive structure is taken as an example.

As shown in FIG. 3, the touch layer TSP may include a plurality of touch electrodes TMB located in the display area AA, and individual touch electrodes TMB are distributed in an array and distributed at intervals from each other. Each touch electrode TMB forms a self-capacitance with the ground. When a user touches with a finger, the capacitance of the finger is superimposed on the self-capacitance of the touch electrode TMB, so that the capacitance increases. Thus, a position of a touch point, i.e., a position of the touch electrode TMB corresponding to the touch point, can be determined by detecting the change in the capacitance of the touch electrode TMB.

Each touch electrode TMB can be coupled to the driving chip TIC through a touch lead TL1. For example, one touch electrode TMB can be coupled to one touch lead TL1. Each touch lead TL1 extends from the display area AA to the lead-out area FA and is coupled to the functional pin P1a of the driving chip TIC so as to apply a touch driving signal to the touch electrode TMB and receive a touch sensing signal generated based on a capacitance change.

Furthermore, in order to improve the light transmittance, the touch electrode TMB may be in a mesh structure, and the light emitting device may correspond to a mesh hold of the mesh structure, thereby reducing the shielding of light by the touch electrode TMB.

In addition, as shown in FIG. 2, the touch layer TSP may further include a buffer layer TBU and a protective layer TOC. The buffer layer TBU may serve as the base of the touch layer TSP, and may be disposed on a surface of the encapsulation layer TFE away from the substrate SU, and a material of the buffer layer TBU may include an insulation material such as silicon nitride and silicon oxide. The protective layer TOC may cover the touch electrode TMB, and a material of the protective layer TOC may be a transparent insulation material such as polyimide (PI) or optical glue.

In addition, in other embodiments of the present disclosure, the touch layer TSP may also adopt a mutual-capacitive structure, and the structure thereof is not particularly limited herein.

The following is a detailed description of the driving chip TIC.

Figures 6, 7:
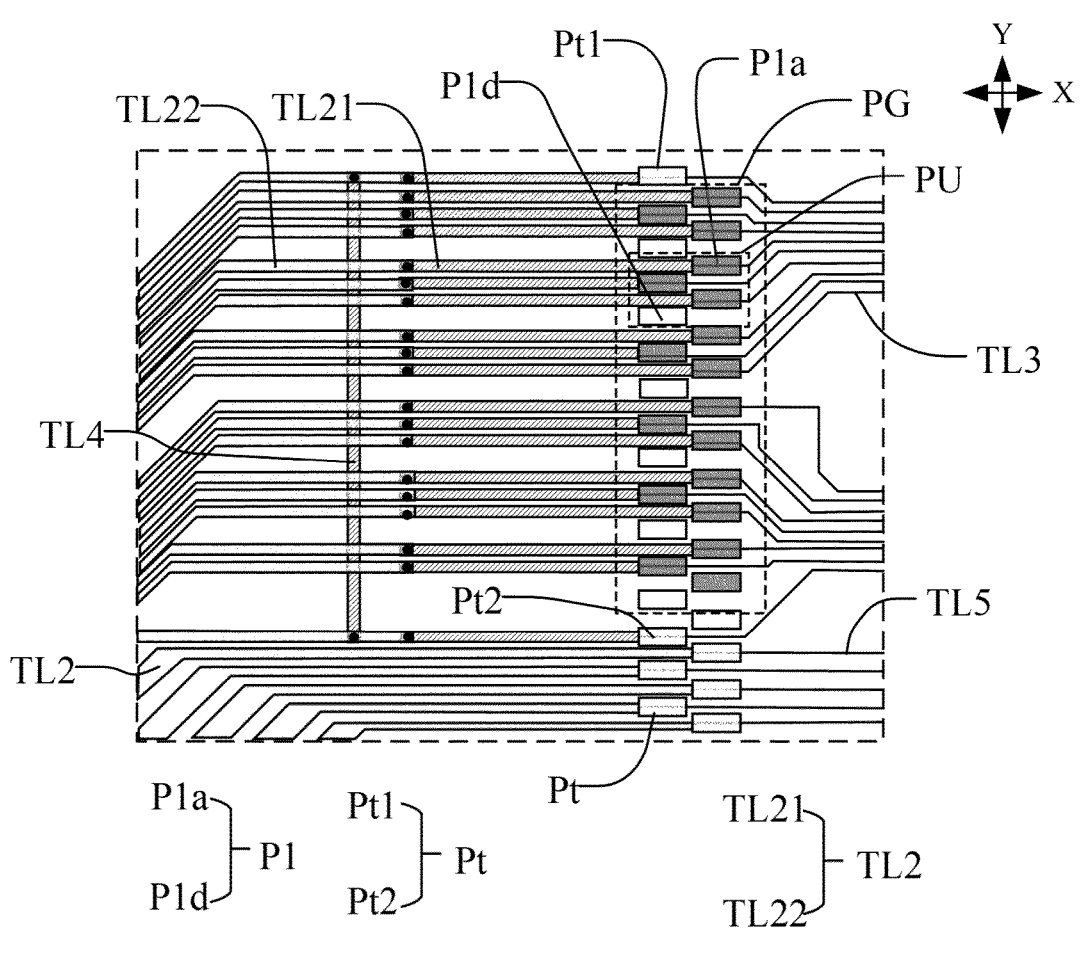
FIG. 6 is a partial enlarged view of a lead-out area in an embodiment of a touch display panel in the present disclosure.
FIG. 7 is a schematic diagram of a first touch pin and a gating circuit in an embodiment of a touch display panel in the present disclosure.

As shown in FIGS. 5 to 7, the driving chip TIC may be stacked on the lead-out area FA of the driving backplane BP, and is located between the bending area BA and the binding portion PA, and is coupled to the binding portion PA. The driving chip TIC may be configured to output the touch driving signal to the touch layer TSP, and receive a touch sensing signal to realize the touch function. In addition, the driving chip TIC may further be configured to drive the light emitting device LD to emit light through the driving circuit to display an image, thereby realizing the integration of display and touch functions. Alternatively, the driving chip TIC can also be used only to realize the touch function, while the display of the image can be realized by other chips.

The driving chip TIC has at least one touch pin group PG and a plurality of gating circuits Mux. The touch pin group PG may include a plurality of first touch pins P1, some of which are functional pins P1a, and some of which are dummy pins P1d. Each functional pin P1a of the touch pin group PG is coupled to a touch lead TL1. For example, a touch lead TL1 and a functional pin P1a may be coupled through a connection trace TL3, and a connection trace TL3 may be an integral structure with a touch lead TL1 coupled thereto. Alternatively, the connection trace TL3 and the touch lead TL1 may also be independent structures coupled by a connection process. As shown in FIG. 5 and FIG. 11, the connection trace TL3 may overlap with the driving chip TIC.

The driving chip TIC further has a second touch pin P2, and the second touch pin P2 can be coupled to the first touch pin P1 through a gating circuit Mux. In addition, the second touch pin P2 can be coupled to some pins of the binding portion PA, and the binding portion PA and the control circuit board can be coupled through a flexible circuit board, so as to transmit the touch driving signal. The gating circuit Mux may be part of an internal circuit integrated in the driving chip TIC. A first touch pin P1 of a touch pin group PG can be coupled to a second touch pin P2 through a gating circuit Mux, and second touch pins P2 coupled to different gating circuits Mux can be different.

For example, as shown in FIG. 7, one second touch pin P2 can be coupled to multiple first touch pins P1 through a gating circuit Mux. In addition, the pins of the binding portion PA include a binding pin PA1, and the second touch pin P2 can be coupled to the binding pin PA1, and the second touch pin P2 and the binding pin PA1 may be coupled one by one.

It should be noted that FIG. 7 is a schematic diagram for illustrating a connection relationship between a first touch pin P1, a gating circuit Mux and a second touch pin P2, which does not constitute a limitation on an actual structure of the driving chip TIC.

In some embodiments of the present disclosure, the driving chip TIC may include two touch terminals TIC1 distributed along the row direction X and a first pin terminal TIC2 and a second pin terminal TIC3 distributed along the column direction Y. The second pin terminal TIC3 is located on a side of the first pin terminal TIC2 close to the binding portion PA.

A touch pin group PG may be located at a touch terminal TIC1. If there are two touch pin groups PG, they are located at two touch terminals TIC1, respectively, and the touch pin groups PG at the two touch terminals TIC1 may be symmetrically arranged about a central axis of the driving chip TIC along the column direction Y.

Figure 8:
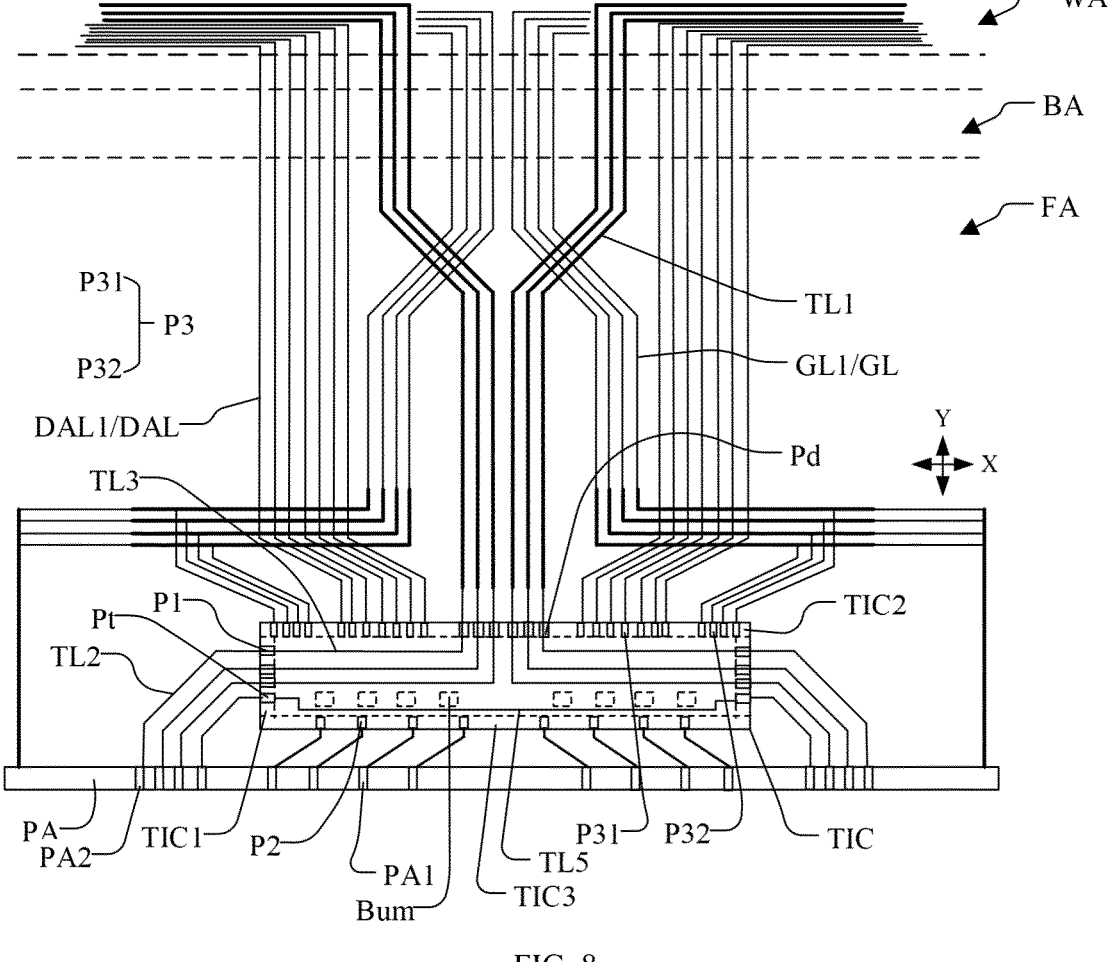
FIG. 8 is a schematic diagram of a touch lead, a peripheral lead and a data line in a lead-out area in FIG. 6.

As shown in FIG. 5 and FIG. 8, the first pin terminal TIC2 may also be provided with a plurality of display pins P3, and the driving circuit for driving the light emitting device LD to emit light may be coupled to at least part of the display pins P3, so as to drive the light emitting device LD to emit light under the control of the driving chip TIC. The display pins P3 may be divided into two display pin groups along the row direction X, and the two display pin groups may be symmetrically arranged about the central axis of the driving chip TIC along the column direction Y, and the dummy touch pin Pd is located between the two display pin groups. The second touch pin P2 may be located at the second pin terminal TIC3.

The first pin terminal TIC2 may have a plurality of dummy touch pins Pd, and the dummy touch pins Pd may be distributed along the row direction X, and may be located between the two display pin groups. Individual touch leads TL1 are coupled to individual dummy touch pins Pd, respectively, for example, the touch leads TL1 and the dummy touch pins Pd may be coupled in a one-to-one correspondence. The dummy touch pin Pd is in a floating state and does not transmit a signal, which is beneficial to improving the uniformity of the coupling between the first pin terminal TIC1 and the driving backplane BP. Alternatively, the dummy touch pin Pd may not be coupled to the touch lead TL1.

The inventors found that for a driving chip TIC, the number of its gating circuits Mux and the total number of first touch pins P1 that can be controlled by all the gating circuits Mux are fixed. If the number of first touch pins P1 required to realize the touch function is less than the total number of pins that can be controlled by the gating circuits Mux, some of the first touch pins P1 need to transmit touch driving signals, and these first touch pins P1 are functional pins P1a, and some of the first touch pins P1 do not need to transmit touch driving signals and do not need to be coupled to the touch leads TL1, and these first touch pins P1 are dummy pins P1d. If each gating circuit Mux is coupled to the dummy pin P1d and the functional pin P1a, each gating circuit Mux needs to be turned on, but there is no need to transmit the signal through the dummy pin P1d, which is not conducive to reducing energy consumption.

In order to solve the above problems, the present disclosure designs a coupling mode between the gating circuit Mux and the first touch pin P1, as shown in FIG. 6 and FIG. 7, so that first touch pins P1 coupled to at least one gating circuit Mux are all dummy pins P1d. For the gating circuit Mux to which the first touch pins P1 coupled are all dummy pins P1d, since there is no need for signal transmission, the gating circuit Mux can be turned off, and only the gating circuit Mux coupled to the functional pin P1a is operated, thereby reducing power consumption without affecting the touch function.

Specifically, when the touch function is realized, the gating circuit Mux coupled to the functional pin P1a can be configured to sequentially conduct the second touch pin P2 and the functional pins P1a coupled thereto, that is, the functional pins P1a and the second touch pin P2 are in communication with each other, so as to transmit the touch driving signal to the touch lead TL1 and drive the touch layer TSP. In addition, the gating circuit Mux coupled to the dummy pin P1d remains in an off state, the dummy pin P1d is floating, and does not need to receive the control signal. Turning off the gating circuit Mux coupled to the dummy pin P1d does not affect the touch function and can reduce the power consumption.

The following is an illustrative description of an arrangement manner of the functional pins P1a and the dummy pins P1d among the first touch pins P1.

For ease of description, the first touch pins P1 of the touch pin group PG can be divided to obtain a plurality of pin units PU, each pin unit PU includes a plurality of functional pins P1a and at least one dummy pin P1d. The gating circuit may include a plurality of first gating circuits Mux1 and at least one second gating circuit Mux2. Each first gating circuit Mux1 can be coupled to the first touch pins P1 in the plurality of pin units PU, a functional pin P1a in each pin unit PU is coupled to a first gating circuit Mux1, and a dummy pin P1d in a pin unit PU is coupled to a second gating circuit Mux2. That is, the functional pins P1a coupled to each first gating circuit Mux1 can come from different pin units PU, and the dummy pins P1d coupled to each second gating circuit Mux2 also come from different pin units PU, so that the first touch pins P1 coupled to the first gating circuit Mux1 are all functional pins P1a, and the first touch pins P1 coupled to the second gating circuit Mux2 are all dummy pins Pd.

In some embodiments of the present disclosure, the first touch pins P1 in the same touch pin group PG may be distributed at intervals along the column direction Y, and the last first touch pin P1 of any pin unit PU in the column direction Y is a dummy pin P1d.

For example, as shown in FIG. 6 and FIG. 7, in an embodiment, the number of dummy pins P1d in one pin unit PU in a touch pin group PG is 1. In the column direction Y, a first touch pin P1 closest to the binding portion PA in each pin unit PU is a dummy pin P1d. If the functional pin P1a in each pin unit PU is regarded as a pin sub-unit, then in the column direction Y, individual pin sub-units are alternately distributed with the dummy pins P1d. The number of functional pins P1a in each pin unit PU can be 3, and the number of gating circuits Mux coupled to the first touch pins P1 of the same touch pin group PG can be 4. In this embodiment, the number of functional pins P1a required for the touch function at a touch terminal TIC1 is less than ¾ and greater than ½ of the total number of first touch pins P1 of the touch terminal TIC1.

In an embodiment, the number of dummy pins P1d in one pin unit PU in a touch pin group PG is 2. In the column direction Y, a first touch pin P1 closest to the binding portion PA in each pin unit PU is a dummy pin P1d. If the functional pin P1a in each pin unit PU is regarded as a pin sub-unit, then in the column direction Y, individual pin sub-units are alternately distributed with the dummy pins P1d. The number of functional pins P1a in each pin unit PU can be 3, and the number of gating circuits Mux coupled to the first touch pins P1 of the same touch pin group PG can be 4. In this embodiment, the number of functional pins P1a, at a touch terminal TIC1, required for realizing the touch function is less than ½ of the total number of first touch pins P1 of the touch terminal TIC1.

In some other embodiments of the present disclosure, the first touch pins P1 of a touch pin group PG may include a plurality of pin units PU, at least some of the pin units PU include only functional pins P1a, and at least some of the pin units PU include only dummy pins P1d. The first touch pins P1 in a pin unit PU are coupled to the same gating circuit Mux. That is, first touch pins P1 coupled to a first gating circuit Mux1 are all from the same pin unit PU, and are all functional pins P1a. First touch pins P1 coupled to a second gating circuit Mux2 are all from the same pin unit PU, and are all dummy pins P1d. Individual pin units PU may be distributed along the column direction Y.

Alternatively, in other embodiments of the present disclosure, first touch pins P1 in a touch pin group PG may be distributed in other ways, as long as pins coupled to the second gating circuit Mux2 are all dummy pins P1d.

Further, as shown in FIG. 6 and FIG. 7, the first touch pins P1 in the same touch pin group PG may be arranged in a plurality of columns distributed along the row direction X, and the first touch pins P1 in two adjacent columns are alternately distributed at intervals in the column direction Y, that is, the first touch pins P1 in the two adjacent columns may be staggered along the column direction Y. In addition, individual dummy pins P1d may be located in the same column. For example, the first touch pins P1 in the same touch pin group PG may be arranged in two columns along the row direction X, and the dummy pins P1d are located in a column away from a center of the driving chip TIC, that is, in an outer column.

In some embodiments of the present disclosure, in order to facilitate the test of the touch layer TSP, the driving chip TIC may also have a first test pin Pt, the binding portion PA may have a plurality of second test pins PA2, and the second test pins PA2 and the binding pins PA1 may be distributed at intervals along the row direction X. In addition, the touch display panel further includes a plurality of test lines TL2, a connection trace TL3 may be coupled to a second test pin PA2 via a test line TL2, and since the connection trace TL3 is coupled to the functional pin P1a, the test line TL2 is also coupled to the functional pin P1a. A first test pin Pt may be coupled to a second test pin PA2 via a test line TL2, and a connection trace TL3 may be coupled to a test line TL2, and accordingly, a test line TL2 is coupled to a functional pin P1a.

The first test pin Pt is located at the touch terminal TIC1, and the first test pins Pt and the first touch pins P1 are distributed at intervals. At least part of the test lines TL2 coupled to the first test pins Pt can be used for grounding.

Alternatively, a test line TL2 for accessing other signals such as test signals can also be included.

As shown in FIG. 5, FIG. 6, FIG. 10 and FIG. 11, in some embodiments, the two touch terminals TIC1 both have first test pins Pt, and the first test pins Pt of the two touch terminals TIC1 are symmetrically distributed. Two first test pins Pt respectively belonging to the two touch terminals TIC1 can be coupled through a test connection line TL5 to transmit a ground signal or other signals. The driving chip TIC can overlap with the test connection line TL5.

As shown in FIG. 6, since the touch terminal TIC1 has limited pins that can be grounded, two or more test lines TL2 can be coupled via a ground connection line TL4. As long as one of these test lines TL2 is coupled to a pin that can achieve a grounding function, multiple test lines TL2 can be grounded. The ground connection line TL4 can extend along the column direction Y, so that it can cross multiple test lines TL2. In order to avoid short circuit, the test lines TL2 can be a multi-layer structure, and the ground connection line TL4 can be set on the same layer as one layer of the multi-layer structure and can be crossed with the remaining layers of the multi-layer structure.

For example, as shown in FIG. 6, the first test pin Pt1 can be a pin that realizes the grounding function, while the first test pin Pt2 cannot be a pin that realizes the grounding function, but the test lines TL2 coupled to the first test pin Pt1 and the first test pin Pt2 need to be grounded, therefore, the two test lines TL2 coupled to the first test pin Pt1 and the first test pin Pt2 can be coupled by using the ground connection line TL4, so that the two test lines TL2 can both realize the grounding function. In addition, since the ground connection line TL4 extends along the column direction Y and is crossed with multiple test lines TL2, but it needs to be coupled with two test lines TL2, therefore, the test line TL2 that is crossed with the ground connection line TL4 can be at least divided into a first segment TL21 and a second segment TL22 located at different layers. The first segment TL21 and the second segment TL22 are in different layers and cross. The first segment TL21 can be coupled to the connection trace TL3 or the first test pin Pt, and the second segment TL22 can be coupled to the first segment TL21 through a contact hole and coupled to the second test pin PA2. For example, the first segment TL21, the connection trace TL3 and the ground connection line TL4 are arranged in the same layer on the first gate layer GA1, and the second segment TL22 is arranged in the first source-drain layer SD1. The ground connection line TL4 and the second segment TL22 crosses but are in different layers, and can be coupled to two test lines TL2 respectively through contact holes.

Not all pins in the binding portion PA are bound to the flexible circuit board. The binding pin PA1 can be bound to the flexible circuit board, while the second test pin PA 2 is not bound to the flexible circuit board and is only used for testing the touch function.

In addition, as shown in FIG. 5, in order to support the driving chip TIC, a supporting bump Bum is provided on a side of the driving chip TIC close to the driving backplane BP to support the driving chip TIC.

With respect to the above-mentioned driving backplane BP, driving chip TIC and pins thereof, the present disclosure also provides a new solution for paths, in the lead-out area FA, of leads coupling some pins, which is exemplarily described below.

As shown in FIG. 5 and FIG. 8 to FIG. 10, in some embodiments of the present disclosure, in order to adapt to the positions of the display pin P3 and the dummy touch pin Pd of the driving chip TIC and facilitate wiring, the touch lead TL1 and the peripheral lead GL can be partially crossed in the lead-out area FA.

Figure 9:
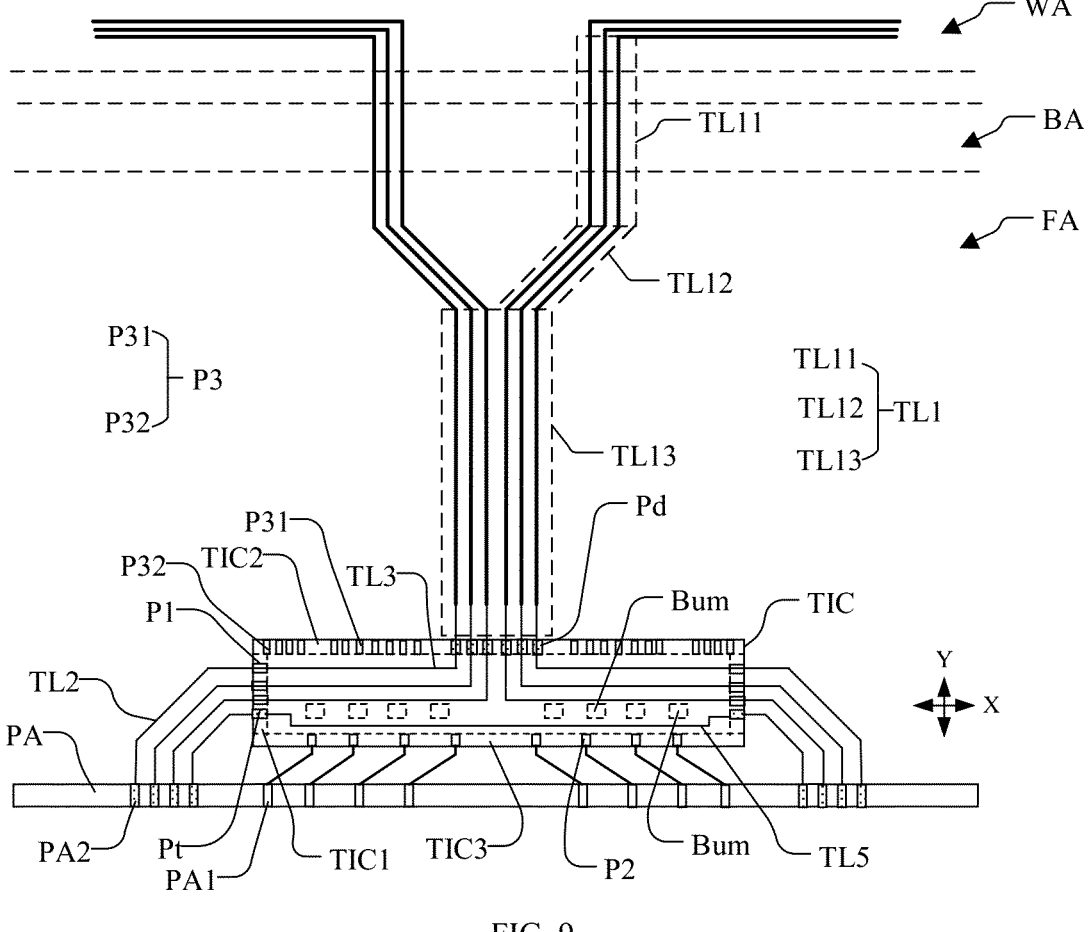
FIG. 9 is a schematic diagram of a touch lead in a lead-out area in FIG. 6.

As shown in FIGS. 5, 8 and 9, portions of the touch leads TL1 in the lead-out area FA may include two touch lead-out segments TL11, two touch transition segments TL12 and one touch connection segment TL13 distributed along the column direction Y. The touch lead-out segment TL11, the touch transition segment TL12 and the touch connection segment TL13 all include portions of multiple touch leads TL1 in the lead-out area FA. That is, the touch lead-out segment TL11, the touch transition segment TL12 and the touch connection segment TL13 are all collections of portions of multiple touch leads TL1 in the lead-out area FA, rather than specifically referring to a specific touch lead TL1. The touch lead-out segment TL11 is coupled to a part of the touch leads TL1 in the peripheral area WA, and two touch lead-out segments TL11 are distributed at intervals along the row direction X. The touch connection segment TL13 is coupled to each connection trace TL3, for example, individual touch leads TL1 of the touch connection segment TL13 can be coupled to respective connection traces TL3 in a one-to-one correspondence, thereby being coupled to respective functional pins P1a in a one-to-one correspondence. Correspondingly, the touch connection segment TL13 can be coupled to the dummy touch pin Pd. In addition, a touch lead-out segment TL11 is coupled to a touch connection segment TL13 through a touch transition segment TL12, and the touch connection segment TL13 is located between the two touch lead-out segments TL11. The touch lead-out segment TL11 and the touch connection segment TL13 both extend along the column direction Y. An extension direction of the touch transition segment TL12 is different from the row direction X and the column direction Y, so that it is tilted relative to the row direction X and the column direction Y. An angle between the two touch transition segments TL12 can be an acute angle, alternatively, it can also be a right angle or an obtuse angle. Further, the two touch lead-out segments TL11 can be symmetrical about the central axis of the driving chip TIC along the column direction Y, and the two touch transition segments TL12 can be symmetrical about the central axis of the driving chip TIC along the column direction Y.

As shown in FIG. 9, through the above-mentioned scheme of segmenting the portions of the touch leads TL1 in the lead-out area FA, the portions of the touch leads TL1 in the lead-out area FA can be extended in a "Y" shape. When entering the lead-out area FA, the touch leads TL1 are divided into two touch lead-out segments TL11, which are coupled by two touch transition segments TL12 and converge at the touch connection segment TL13, and are coupled to respective connecting traces TL3.

In addition, as shown in FIGS. 5, 8 and 10, the peripheral lead GL can extend from the peripheral area WA to the lead-out area FA, and is coupled to the peripheral circuit in the peripheral area WA, and is coupled to the driving chip TIC through part of the display pins P3 in the lead-out area FA. The peripheral lead GL and the touch lead TL1 are located in different layers, for example, the touch lead TL1 can be located in the touch layer TSP, and the peripheral lead GL can be located in the driving backplane BP.

The portions of the peripheral leads GL in the lead-out area FA can be divided into two peripheral lead groups GL1 distributed along the row direction X. A peripheral line group GL1 may include a display lead-out segment GL11, a display transition segment GL12 and a first display extension segment GL13 distributed along the column direction Y. The display transition segment GL12 may be coupled between the display lead-out segment GL11 and the first display extension segment GL13. The display lead-out segment GL11 is coupled to a part of the peripheral leads located in the peripheral area WA, and the first display extension segment GL13 is coupled to part of the display pins P3. The display lead-out segment GL11 and the first display extension segment GL13 both extend along the column direction Y, an extension direction of the display transition segment GL12 is different from the row direction X and the column direction Y, and is thus tilted relative to the row direction X and the column direction Y. An angle between the two touch transition segments TL12 may be an acute angle, or, alternatively, a right angle or an obtuse angle. Further, the two peripheral line groups GL1 may be symmetrical about the central axis of the driving chip TIC along the column direction Y.

As shown in FIG. 5 and FIG. 8, the two display lead-out segments GL11 are located between the two touch lead-out segments TL11, and the touch transition segments TL12 and the display transition segments GL12 cross one by one. However, since the touch transition segment TL12 and the display transition segment GL12 are not in the same layer, they are not coupled. The two display lead-out segments GL11 are located between the two touch lead-out segments TL11, and the touch connection segment TL13 is located between the two first display extension segments GL13.

In addition, as shown in FIG. 5, FIG. 8 and FIG. 10, the peripheral line group GL1 further includes a second display extension segment GL14 and a display connection segment GL15. The second display extension segment GL14 can extend along the row direction X and is coupled to an end of the first display extension segment GL13 away from the display area AA. The second display extension segment GL14 can extend away from the touch connection segment TL13 along the row direction X. The display connection segment GL15 extends along the column direction Y and is located outside the two data line groups DAL1 and is coupled to part of the display pins P3.

As shown in FIG. 5 and FIG. 8 to FIG. 10, the first power bus VDB mentioned above can be arranged in the peripheral area WA, and can extend to the lead-out area FA and be coupled to the binding portion PA to transmit the first power signal. The first power bus VDB, the touch lead TL1 and the peripheral lead GL are all located in different layers, and the touch lead TL1 is located on a side of the first power bus VDB away from the peripheral lead GL.

The power line may extend along the column direction Y and extend from the display area AA to the peripheral area WA and is coupled to the first power bus VDB. One column of power lines is coupled to at least one column of pixel circuits.

A portion of the first power bus VDB in the lead-out area FA includes a shielding portion VDB1 and a connection portion VDB2. The shielding portion VDB1 is coupled to a portion of the first power bus VDB in the peripheral area WA, and the connection portion VDB2 is coupled to the shielding portion VDB1 and the binding portion PA to receive the first power signal. The touch lead-out segment TL11, the touch transition segment TL12, the display lead-out segment GL11, and the display transition segment GL12 are all at least partially overlapped with the shielding portion VDB1. Since the first power signal is a constant signal, the shielding portion VDB1 can be used to prevent the signal in the peripheral lead from interfering with the signal in the touch lead TL1. In order to improve the shielding effect, orthographic projections of the touch lead-out segment TL11, the touch transition segment TL12, the display lead-out segment GL11, and the display transition segment GL12 on the substrate SU are all located within an orthographic projection of the shielding portion VDB1 on the substrate SU.

Furthermore, there are two connection portions VDB2 coupled to both ends of the shielding portion VDB1 in the row direction X. The driving chip TIC is located between the two connection portions VDB2, and the shielding portion VDB1 is located on a side of the driving chip TIC away from the binding portion PA.

The peripheral line group GL1 may further include a third display extension segment GL16, one end of which is coupled to an end of the second display extension segment GL14 away from the first display extension segment GL13, and may extend away from the first display extension segment GL13 along the row direction X. In addition, the third display extension segment GL16 may overlap with portions of the connection portion VDB2 and the second power bus VSB located in the lead-out area FA, and the third display extension segment GL16 and the portions of the connection portion VDB2 and the second power bus VSB located in the lead-out area FA are located in different layers.

In some embodiments of the present disclosure, the data line DAL may extend along the column direction Y, and extend from the display area AA to the lead-out area FA, and may be coupled to part of the display pins P3. One column of data lines DAL is coupled to at least one column of pixel circuits to transmit the data signal. The portions of the data lines DAL located in the lead-out area FA may include two data line groups DAL1 distributed along the row direction X, and the touch lead-out segment TL11, the touch transition segment TL12, the touch connection segment TL13, the display lead-out segment GL11, the display transition segment GL12, and the display connection segment GL15 are all located between the two data line groups DAL1.

The data line group DAL1, the first power bus VDB and the touch lead TL1 are all located in different layers, and the touch lead TL1 is located on a side of the first power bus VDB away from the touch lead group. In addition, the data line group DAL1 and the shielding portion VDB1 at least partially overlap, so that the shielding portion VDB1 can prevent the data signal of the data line DAL from interfering with the signal in the touch lead TL1. The second display extension segment GL14 and the data line group DAL1 cross and are located in different layers.

Based on the above wiring, the display pins P3 of the two display pin P3 groups of the first pin terminal TIC2 include a first display pin P31 and a second display pin P32, the peripheral lead GL is coupled to the driving chip TIC through the first display pin P31, and the data line DAL can be coupled to the driving chip TIC through the second display pin P32.

In a display pin P3 group, the first display pin P31 may be located on a side of the second display pin P32 away from the dummy touch pin Pd in the row direction X. The display pins P3 of two display pin P3 groups may be symmetrical about the central axis of the driving chip TIC along the column direction Y.

In addition, the second power bus VSB extends from the peripheral area WA to the lead-out area FA and is located on a side of the first power bus VDB away from the display area AA, that is, located outside the first power bus VDB. The second power bus VSB located in the lead-out area FA can be coupled to some pins of the binding portion PA.

In addition, as shown in FIG. 6, the touch connection trace TL2 may include a first segment TL21 and a second segment TL22 located in different layers. The first segment TL21 is coupled to the functional pin P1a, the second segment TL22 is coupled to the first segment TL21 and the binding portion PA, and the first segment TL21 and the second segment TL22 are coupled through a contact hole.

The following uses individual film layers of the driving backplane listed above as an example to explain film layers where some traces are located.

As shown in FIG. 2 and FIG. 5 to FIG. 10, for any one of the first power bus VDB, the second power bus VSB, the power line, the data line DAL, the peripheral lead GL and the touch lead TL1, a portion thereof located in the peripheral area WA and a portion thereof located in the lead-out area FA may be located in the same film layer or in different film layers. In addition, the portion located in the lead-out area FA may also be formed by coupling line segments located in different film layers.

For example, portions of the first power bus VDB and the second power bus VSB located in the lead-out area FA may be located in at least one of the first gate layer GA1, the second gate layer GA2, and the third gate layer GA3.

Portions of the power line and the data line DAL located in the display area AA and the peripheral area WA may be located in at least one of the first source-drain layer SD1 and the second source-drain layer SD2, and portions of the data lines DAL located in the lead-out area FA may be located in at least one of the first gate layer GA1, the second gate layer GA2, and the third gate layer GA3.

The portions of the peripheral leads GL located in the lead-out area FA may be located in at least one of the first gate layer GA1, the second gate layer GA 2 and the third gate layer GA 3, and the portion of the peripheral lead GL in the lead-out area FA may be located in the same layer as the portion of the data line DAL located in the lead-out area FA. For example, the display lead-out segment GL11, the display transition segment GL12, the first display extension segment GL13, the display connection segment GL15 and the third display extension segment GL16 may be located in the first gate layer GA1 with the portion of the data line DAL located in the lead-out area FA, and the second display extension segment GL14 may be located in the first source-drain layer SD 1, so that the second display extension segment GL14 crosses but is not coupled to the portion of the data line DAL located in the lead-out area FA.

The touch lead TL1 and the touch electrode TMB may be located in the same layer.

The present disclosure further provides a display device, which may include a touch display panel of any of the above embodiments. The touch display panel is a touch display panel of any of the above embodiments, and for its specific structure and beneficial effects, reference may be made to the embodiments of the display panel above, which will not be repeated here. The display device of the present disclosure can be a mobile phone, a smart watch, a smart bracelet, a tablet computer, a television, and other electronic devices with display functions, which will not be listed one by one here.

Other embodiments of the present disclosure will be apparent to those skilled in the art from consideration of the specification and practice of the present disclosure disclosed herein. The present disclosure is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

What is claimed is:

1. A touch display panel, comprising a display area, a peripheral area and a lead-out area, wherein the peripheral area is located outside the display area, the lead-out area is arranged outside the peripheral area along a column direction, and the lead-out area comprises a binding portion for coupling to a flexible circuit board;

the touch display panel comprises:

a touch layer; and a driving chip, comprising at least one touch pin group and a plurality of gating circuits, wherein the at least one touch pin group comprises a plurality of first touch pins, first touch pins of a touch pin group comprise a plurality of functional pins and at least one dummy pin, the touch layer is coupled to individual functional pins through a plurality of touch leads, a functional pin is at least coupled to a touch lead, and the driving chip further comprises a second touch pin coupled to the binding portion;

wherein the second touch pin is coupled to individual first touch pins through a gating circuit, and first touch pins coupled to at least one of the gating circuits are all dummy pins; and wherein the gating circuit coupled to the functional pins is configured to sequentially conduct the second touch pin and respective functional pins coupled to the second touch pin, and a gating circuit coupled to a dummy pin is turned off.

2. The touch display panel according to claim 1, wherein the first touch pins of the touch pin group comprise a plurality of pin units, each of the pin units comprises a plurality of functional pins and at least one dummy pin, and the gating circuits comprise a first gating circuit and a second gating circuit; and a gating circuit is coupled to first touch pins in the plurality of pin units, a functional pin in each pin unit is coupled to the first gating circuit, at least two functional pins in the same pin unit are coupled to different first gating circuits, and a dummy pin in a pin unit is coupled to the second gating circuit.

3. The touch display panel according to claim 2, wherein first touch pins in the same touch pin group are distributed at intervals along the column direction, and the last first touch pin of any pin unit in the column direction is a dummy pin.

4. The touch display panel according to claim 3, wherein the first touch pins in the same touch pin group are arranged in a plurality of columns along a row direction, first touch pins in two adjacent columns are alternately distributed at intervals in the column direction, and dummy pins are located in the same column.

5. The touch display panel according to claim 4, wherein the number of touch pin groups is two, and the touch pin groups are located at two ends of the driving chip in the row direction.

6. The touch display panel according to claim 1, wherein the first touch pins of the touch pin group comprise a plurality of pin units, at least some of the pin units comprise only functional pins, at least some of the pin units comprise only dummy pins, and first touch pins in a pin unit are coupled to the same gating circuit.

7. The touch display panel according to claim 1, wherein the lead-out area further comprises a bending area extended along a row direction, and the binding portion is located on a side of the bending area away from the display area; and the driving chip is arranged in the lead-out area and is located between the bending area and the binding portion.

8. The touch display panel according to claim 1, wherein the driving chip comprises two touch terminals distributed along a row direction and a first pin terminal and a second pin terminal distributed along the column direction, a touch pin group is located at a touch terminal, the second pin terminal is located at a side of the first pin terminal close to the binding portion, and the second touch pin is located at the second pin terminal;

the first pin terminal comprises a plurality of display pins; a touch lead is coupled to a functional pin via a connection trace; the driving chip is at least partially overlapped with the connection trace;

the touch display panel further comprises:

a plurality of light emitting devices, arranged in the display area;

a driving backplane, configured to drive the light emitting devices to emit light, and comprising a pixel circuit, a peripheral circuit and a peripheral lead, wherein the pixel circuit is located in the display area, the peripheral circuit is located in the peripheral area, the peripheral lead is extended from the peripheral area to the lead-out area, and is coupled to the peripheral circuit, and is coupled to the driving chip through part of the display pins, and the peripheral lead and the touch leads are located in different layers; and the touch layer is arranged on a side of the light emitting devices away from the driving backplane.

9. The touch display panel according to claim 8, wherein portions of the touch leads in the lead-out area comprise two touch lead-out segments, two touch transition segments and one touch connection segment along the column direction, the touch lead-out segments are coupled to portions of the touch leads in the peripheral area, the touch connection segment is coupled to the functional pin through the connection trace, a touch lead-out segment is coupled to the touch connection segment via a touch transition segment, and the touch connection segment is located between the two touch lead-out segments; the touch lead-out segments and the touch connection segment are extended along the column direction, and an extension direction of the touch transition segment is different from the row direction and the column direction;

portions of peripheral leads in the lead-out area are divided into two peripheral lead groups distributed along the row direction;

a peripheral line group comprises a display lead-out segment, a display transition segment and a first display extension segment distributed along the column direction, and the display transition segment is coupled between the display lead-out segment and the first display extension segment; the display lead-out segment is coupled to a part of the peripheral leads in the peripheral area, and the first display extension segment is coupled to part of the display pins; the display lead-out segment and the first display extension segment are both extended along the column direction, and an extension direction of the display transition segment is different from the row direction and the column direction; and two display lead-out segments are located between the two touch lead-out segments, the touch transition segments and display transition segments are crossed in a one-to-one correspondence, and the touch connection segment is located between two first display extension segments.

10. The touch display panel according to claim 9, wherein the touch display panel further comprises:

a first power bus, arranged in the peripheral area, extended to the lead-out area and coupled to the binding portion, and configured to transmit a first power signal, wherein the first power bus, the touch leads and the peripheral leads are all located in different layers, and the touch leads are located on a side of the first power bus away from the peripheral leads; and a plurality of power lines, extended along the column direction and extended from the display area to the peripheral area, and coupled to the first power bus, wherein a column of power lines is coupled to at least one column of pixel circuits;

wherein a part of the first power bus in the lead-out area comprises a shielding portion and a connection portion, the shielding portion is coupled to a part of the first power bus in the peripheral area, and the connection portion is coupled to the shielding portion and the binding portion; and the touch lead-out segments, the touch transition segments, the display lead-out segment and the display transition segment are all at least partially overlapped with the shielding portion.

11. The touch display panel according to claim 9, wherein the touch display panel further comprises:

a data line, extended along the column direction and extended from the display area to the lead-out area and coupled to part of the display pins, wherein a column of data lines is coupled to at least one column of pixel circuits to transmit data signals;

wherein portions of data lines in the lead-out area comprise two data line groups distributed along the row direction, and the touch lead-out segments, the touch transition segments, the touch connection segment, the display lead-out segment, the display transition segment and the display connection segment are all located between the two data line groups; the data line groups, the first power bus and the touch leads are all located in different layers, and the touch leads are located on a side of the first power bus away from the data line groups, and the data line groups are at least partially overlapped with the shielding portion.

12. The touch display panel according to claim 11, wherein the peripheral line group further comprises a second display extension segment and a display connection segment, the second display extension segment is extended along the row direction, and is coupled to an end of the first display extension segment away from the display area, and is extended away from the touch connection segment along the row direction; the second display extension segment and a data line group are crossed and located on different layers; and the display connection segment is extended along the column direction, is located outside the two data line groups, and is coupled to part of the display pins.

13. The touch display panel according to claim 11, wherein the display pins are divided into two display pin groups along the row direction, the first pin terminal comprises a dummy touch pin located between the two display pin groups, and the touch connection segment is coupled to the dummy touch pin.

14. The touch display panel according to claim 13, wherein display pins of the two display pin groups each comprise a first display pin and a second display pin, the peripheral lead is coupled to the driving chip through the first display pin, and the data line is coupled to the driving chip through the second display pin; and in a display pin group, the first display pin is located on a side of the second display pin away from the dummy touch pin along the row direction.

15. The touch display panel according to claim 12, wherein the driving backplane comprises:

a substrate;

a first semiconductor layer, disposed on a side of the substrate, wherein a material of the first semiconductor layer is polycrystalline silicon;

a first gate insulation layer, wherein the first semiconductor layer is covered by the first gate insulation layer;

a first gate layer, disposed on a surface of the first gate insulation layer away from the substrate and overlapped with at least part of the first semiconductor layer;

a first insulation layer, wherein the first gate layer is covered by the first insulation layer;

a second gate layer, disposed on a surface of the first insulation layer away from the substrate;

a second insulation layer, wherein the second gate layer is covered by the second insulation layer;

a second semiconductor layer, disposed on a surface of the second insulation layer away from the substrate, wherein a material of the second semiconductor layer is a metal oxide;

a second gate insulation layer, wherein the second semiconductor layer is covered by the second gate insulation layer;

a third gate layer, disposed on a surface of the second gate insulation layer away from the substrate and overlapped with at least part of the second semiconductor layer;

a third insulation layer, wherein the third gate layer is covered by the third insulation layer;

a first source-drain layer, disposed on a surface of the third insulation layer away from the substrate;

a first planarization layer, disposed on a side of the first source-drain layer away from the substrate;

a second source-drain layer, disposed on a surface of the first planarization layer away from the substrate; and a second planarization layer, wherein the second source-drain layer is covered by the second planarization layer;

wherein the light emitting devices are disposed on a side of the second planarization layer away from the substrate.

16. The touch display panel according to claim 1, wherein the touch layer comprises a plurality of touch electrodes distributed in an array, and a touch electrode is coupled to a touch lead.

17. The touch display panel according to claim 8, wherein the driving chip further comprises a first test pin; the binding portion comprises a plurality of second test pins; the touch display panel further comprises a plurality of test lines; and a connection trace is coupled to a second test pin through a test line, and a first test pin is coupled to a second test pin through a test line.

18. A display device, comprising a touch display panel, wherein the touch display panel comprises a display area, a peripheral area and a lead-out area, wherein the peripheral area is located outside the display area, the lead-out area is arranged outside the peripheral area along a column direction, and the lead-out area comprises a binding portion for coupling to a flexible circuit board;

the touch display panel comprises:

a touch layer; and a driving chip, comprising at least one touch pin group and a plurality of gating circuits, wherein the at least one touch pin group comprises a plurality of first touch pins, first touch pins of a touch pin group comprise a plurality of functional pins and at least one dummy pin, the touch layer is coupled to individual functional pins through a plurality of touch leads, a functional pin is at least coupled to a touch lead, and the driving chip further comprises a second touch pin coupled to the binding portion;

wherein the second touch pin is coupled to individual first touch pins through a gating circuit, and first touch pins coupled to at least one of the gating circuits are all dummy pins; and wherein the gating circuit coupled to the functional pins is configured to sequentially conduct the second touch pin and respective functional pins coupled to the second touch pin, and a gating circuit coupled to a dummy pin is turned off.

\* \* \* \* \*